United States Patent [19]

Kumasaka et al.

[11] Patent Number: 4,952,951
[45] Date of Patent: Aug. 28, 1990

[54] ELECTROPHOTOGRAPHIC RECORDING APPARATUS

[75] Inventors: Takao Kumasaka, Takahagi; Yuzuru Simazaki, Hitachi; Kiyohiko Tanno, Katsuta, all of Japan

[73] Assignees: Hitachi, Ltd.; Hitachi Koki Co., Ltd., both of Tokyo, Japan

[21] Appl. No.: 391,306

[22] Filed: Aug. 9, 1989

[30] Foreign Application Priority Data

Aug. 12, 1988 [JP] Japan .................. 63-199864

[51] Int. Cl.⁵ .......................................... G01D 15/00
[52] U.S. Cl. ................................. 346/160; 346/160.1
[58] Field of Search ............... 346/150, 153.1, 154, 346/160, 160.1, 157, 76 L, 107 R, 108, 155

[56] References Cited

U.S. PATENT DOCUMENTS 4,780,731 10/1988 Creutzmann ............... 346/160
4,831,408 5/1989 Yoshikawa et al. ........ 346/160

FOREIGN PATENT DOCUMENTS 61-219972 9/1986 Japan ...................... 346/160
62-246175 12/1987 Japan ...................... 346/160

Primary Examiner—Arthur G. Evans
Attorney, Agent, or Firm—Antonelli, Terry, Stout & Kraus

[57] ABSTRACT

An electrophotographic recording apparatus comprises an electrostatic charging device for electrostatically charging a surface of a photosensitive body, an exposure device adapted to form an electric charge latent image on the surface of the photosensitive body, a developing device for effecting developing of the electric charge latent image by using a developer containing at least a toner to thereby form a toner image, and a transferring/fixing device for transferring and fixing onto a recording sheet of paper the toner image formed on the surface of the photosensitive body, the exposure means including a laser exposure section for exposing the surface of the photosensitive body to an optical image of high resolution and a light emitting diode array exposure section for exposing the surface of the photosensitive body to an optical image of low resolution.

33 Claims, 6 Drawing Sheets

FIG. 7A  } $\theta = 0°$

FIG. 7B  } $\theta = \tan^{-1} \frac{\delta}{\ell_1}$

ELECTROPHOTOGRAPHIC RECORDING APPARATUS

BACKGROUND OF THE INVENTION

The present invention relates to an electrophotographic recording apparatus for developing an electrostatic latent image by using a toner.

A conventional electrophotographic recording apparatus such as, for example, a printer employs a laser or an LED (Light Emitting Diode) array as an exposure device. In a multicolor recording device as well which is adapted to employ a plurality of exposure devices, one or more exposure devices of the same type are employed.

On the other hand, an electrophotographic recording apparatus which concurrently uses both a laser exposure and an LED exposure includes, as a proposal, one which is disclosed in Japanese Patent Unexamined Publication No. 61-219971 and one which is disclosed in Japanese Patent Unexamined Publication No. 62-296175. The LED exposure, in the former Publication, was utilized as a blank exposure at the time of effecting normal developing, and, in the latter Publication, was utilized for regulation of laser exposure type energy pattern.

However, the above-described prior art apparatuses have taken no measure against the following inconveniences.

(1) Where two or more laser devices in number are used, the space which is utilized for laser beam scanning or laser beam path becomes large in volume.

(2) Where only two or more LED arrays in number are used, the resolution is limited by the size of an LED element. In addition, there exist variation between a plurality of such LED elements in respect of the luminous area and of the luminous energy. Therefore, when it is desired to obtain a print image having not only a high level of fineness but also a small unevenness of density, the exposure device tends to increase in cost.

SUMMARY OF THE INVENTION

An object of the present invention is to provide an electrophotographic recording apparatus which eliminates the drawbacks inherent in the above-described prior art and which is small in size and makes it possible to obtain a print image of high fineness.

The above object can be achieved by using a laser and an LED array as an exposure means and by subjecting to laser exposure a print image region where high degree of fineness is required.

In the structure of a printer, laser exposure is utilized for obtaining a print image required to have high fineness or high resolution while, on the other hand LED exposure is utilized for obtaining a print image which would be able to serve the purpose even if its degree of fineness or resolution is low. For example, in a multicolor printer, a color image which is capable of having its image portions discriminated from each other by colors is permitted to have a fineness even when this fineness is somewhat lower than that of a black image. In the case where a paper sheet having a narrow width (length thereof as measured in a direction perpendicular to the paper feeding direction) and a paper sheet having a wide or large width are used and printed, there is a tendency that the narrow paper sheet is required to have a higher degree of fineness than the wide paper sheet. By adopting an exposure system wherein a laser and an LED array are concurrently used in combination on the basis of the required degree of fineness, therefore, it would be possible to prevent the apparatus from becoming large in size even if the printer involved is made to have a multifunctional (high fineness, multicolor, moderation of limitation in terms of the size of the paper sheet used) structure.

DESCRIPTION OF THE PREFERRED EMBODIMENTS

An embodiment in which the invention has been applied to a bicolor printer used as a terminal equipment of a computer will now be described with reference to FIGS. 1 and 2. The printer of this embodiment includes a first electrostatic charging section 2, first exposure section 3 and first developing device 4 which are adapted to form a first latent image and develop it by means of a first-color toner, and a second electrostatic charging section 5, second exposure section 6 and second developing device 7 which are adapted to form a second electric charge latent image and develop it by means of a second-color toner. After the bicolor toner image has been formed on a photosensitive body 1 as mentioned above, it is transferred onto a recording sheet of paper 15 by means of a transfer unit 11. Thereafter, the resulting image is fixed to the paper sheet 15 by means of a fixing device 16. A reference numeral 12 denotes a stripping bar, numeral 13 a cleaner, and numeral 14 a static discharger. In this construction according to this embodiment of the present invention, a laser exposure means is used for the first exposure section 3 and an exposure means constituted by an LED array (Light Emitting Diode array) is used for the second exposure section 6. In addition, first and second signal converting sections 19, 20 and a multi-color signal control section 21 for providing synchronization therebetween are provided so that electrical black and color image signals from a computer 17 may be converted into optical images by the laser exposure means 3 and the LED exposure means 6. The first signal converting section 19 is adapted to divide serial data sent from the computer 17 into blocks of data items, each block corresponding to one line, and sweep out each block of data items in the order of time sequence in response to a reference signal from the laser exposure means 3. The second signal converting section 20 is adapted to divide such serial data into blocks of data items, each block corresponding to one line and cause a serial to parallel conversion thereof to thereby arrange such blocks of data items on a parallel basis. Thus, the second signal converting section 20 simultaneously sweeps out the block of data items corresponding to the entire one line and thus sequentially performs a sweeping out of data per specified unit of time on a line by line basis.

The multicolor signal control section 21 is intended for providing synchronization between the printing signals delivered from the first and second signal converting sections 22, 23. To this end, the multicolor signal control section 21 is adapted to designate the timing of sweep-out of a first printing signal (black signal) from the first signal converting section 19 and that of a second printing signal (color signal) from the second signal converting section 20 dependent upon the printing speed and the relative positions of the first and second exposure means 3 and 6. Further, a signal discriminating device 18 may be provided between the computer 17 and the first and second signal converting section 19 and 20 so as to cause the printing signal from the computer 17 to be separated into a black signal and a color signal.

With the above construction, the black signal is converted by the laser 8 into an optical image upon receipt of the two-color printing signals from the computer 17. Then, the resulting optical image is sequentially scanned by a rotating polygonmirror 9. Thus, the photosensitive body 1 is exposed to the image by way of a lens 10. On the other hand, the color signal is converted by the LED array exposure means 6 into an optical image in each unit of data corresponding to at least one line, whereby the photosensitive body 1 is exposed to the resulting optical image in the order of line sequence or block sequence. Accordingly, first and second electric latent images can be formed on the photosensitive body 1 by way of the first electrostatic charging section 2 and first exposure section 3 and by way of the second electrostatic charging section 5 and second exposure section 6, respectively. In the next step of developing process, a bicolor toner image is formed on the photosensitive body through developing effected by using a black toner in the first developing device 4 and a color toner in the second developing device 7. This toner image is transferred onto the paper sheet 15 and then is thermally fused by the fixing device 16 to be fixed onto the paper sheet 15. A bicolor printing is completed through the above-mentioned steps. In the present invention, the laser 8 is employed for the first exposure section 3, whereby the black toner image is prepared with use of the first developing device 4. Namely, where a print image is required to have a high degree of fineness and where it is desired to effect printing of such a highly fine print image, since the invention enables the performance of a high-resolution exposure by means of the laser 8, the invention has the merit that it is possible to effect black printing of a highly fine print image. As regards the color signal, since exposure is carried out using the LED array exposure means 6, the invention has the merit that the second exposure section 6 can have a compact-sized optical system and that the printer as a whole can be made small in size because of a short path for exposure.

Figure 1:
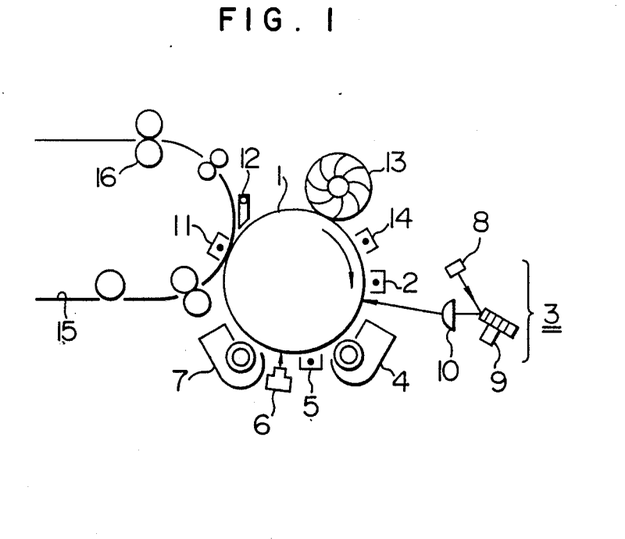
FIG. 1 is a longitudinal sectional view of an electrophotographic recording apparatus in accordance with an embodiment of the invention.
Figure 2:
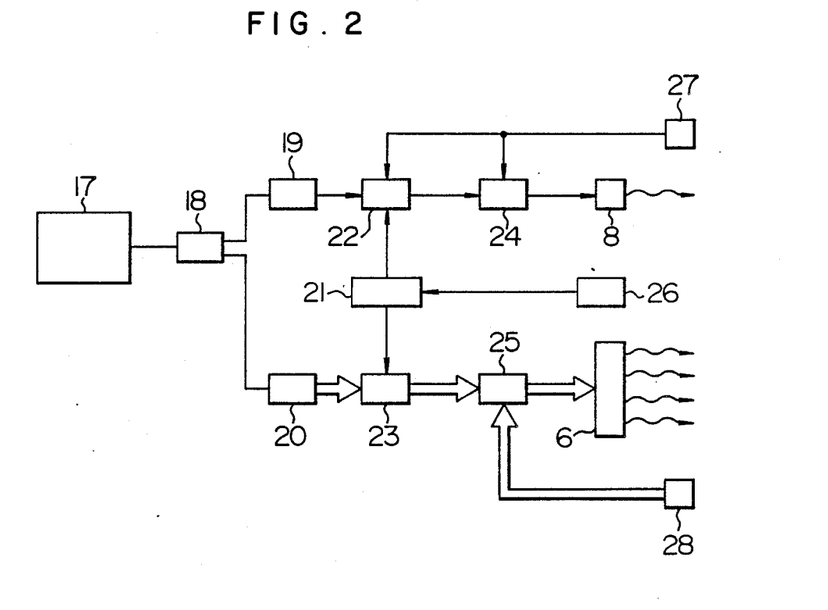
FIG. 2 is a block circuit diagram showing a signal transmission system for the embodiment shown in FIG. 1.
Figure 3:
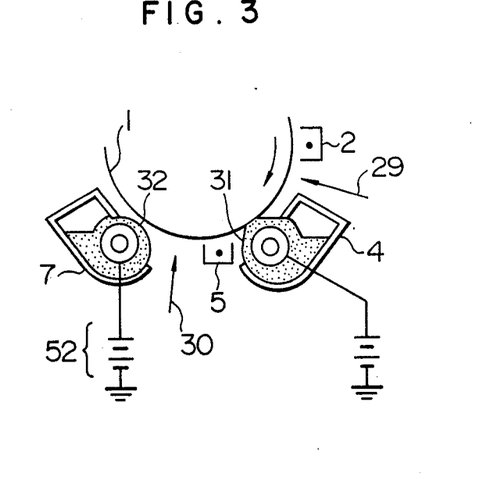
FIG. 3 is a longitudinal sectional view of a part of an electrophotographic recording apparatus in accordance with another embodiment of the invention.

FIG. 3 is a modification of the embodiment shown in FIG. 1, which employs a non-contact developing system. In this system, the second developing device 7 has a developing roll applied thereon with a developer 32, and a gap is provided between this developer 32 and the photosensitive body 1. According to this embodiment, at the time of the second developing, the first-color toner on the photosensitive body 1 does not contact with the developer 32 on the developing roll of the second developing device 7, so that it is advantageously possible to prevent mixing of colors, or scraping of the first-color toner on the photosensitive body 1.

Figure 4:
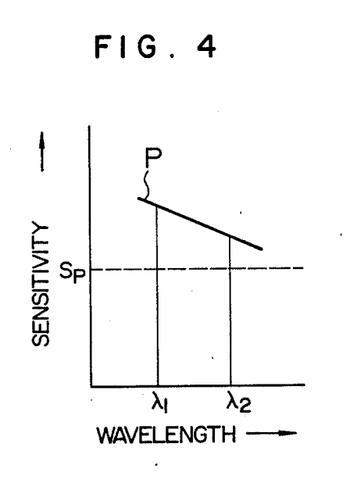
FIGS. 4 and 5 are each a graphic diagram showing the relation between the sensitivity and luminous wavelength.
Figure 5:
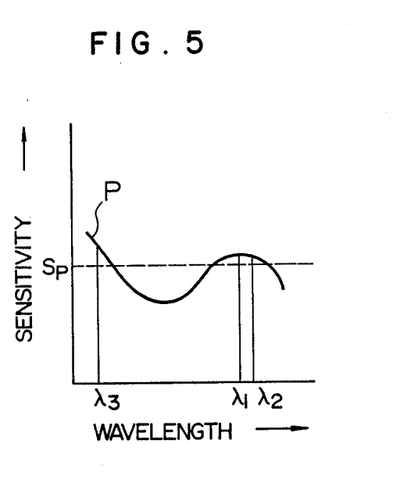

FIGS. 4 and 5 are views each for illustrating the relationship between the wavelength of light emitted from the LED array employed in the present invention and the sensitivity of the photosensitive body. In the Figures, $\lambda_1$ represents the wavelength of laser while $\lambda_2$ and $\lambda_3$ the wavelength of LED.

The photosensitive body 1 employed in the present invention is required to have a sensitivity high enough to effect printing as shown in FIG. 4 (Sp denotes sensitivity high enough to effect printing and indicated by a broken line), with respect to the wavelength of the second exposure LED 6 as well as the wavelength of the first exposure laser 8 (for example 680 nm in case of a semiconductor laser). To satisfy this requirement, the following two methods (1) and (2) can be considered. Explanation thereof will be made below with reference to FIG. 5. (1) Light emitting materials for LED are blended at a specified ratio so as to permit the wavelength $\lambda_2$ of LED to come substantially into coincidence with the wavelength $\lambda_1$ of laser. And (2) where the wavelength $\lambda_3$ of LED is greatly different from that $\lambda_1$ of laser, the construction of, and materials for, the photosensitive body are suitably adjusted so as to permit the sensitivity thereof to become higher than Sp with respect to both the wavelengths $\lambda_1$ and $\lambda_3$. The method mentioned under the item (1) has a merit in that it is possible to employ a photosensitive body for use in laser, without any modification.

Figure 6:
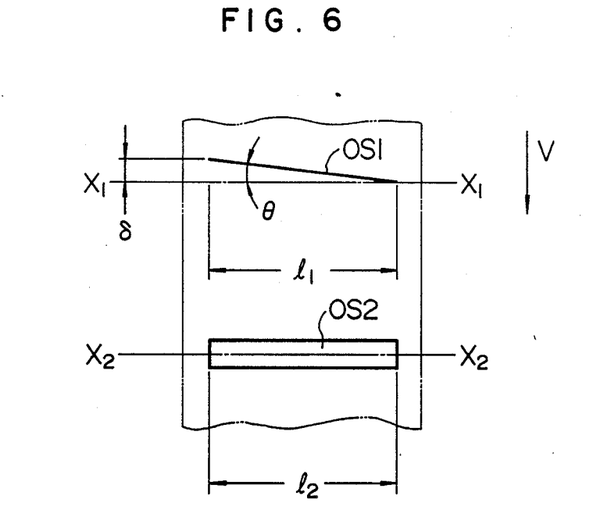
FIG. 6 is a view for illustration of principle in accordance with still another embodiment of the invention.
Figure 7A:
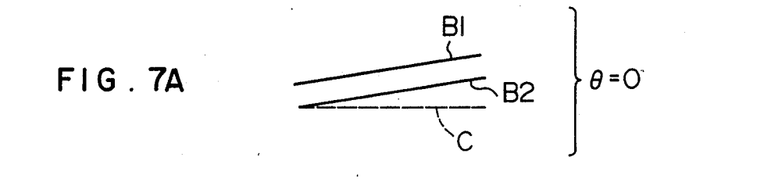
FIGS. 7A and 7B are views for illustrating the effect which can be obtained from the embodiment of FIG. 6.
Figure 7B:
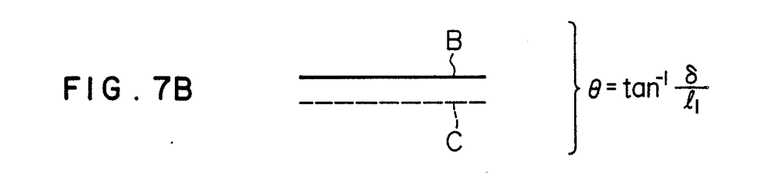

FIG. 6 illustrates a relative positional relationship between a line OS1 of scanning by a laser and a central line OS2 of an LED array. The line (X1—X1) and the line (X2—X2) in the Figure are respectively the parallel lines for the exposure sections which are orthogonal to the direction of feeding of the paper sheet (indicated by an arrow v). The line (X1—X1) is a first exposure reference line while the line (X2—X2) is a second exposure reference line. The characters $l_1$ and $l_2$ represent exposure lengths of the laser and the LED array 6, respectively. The character $\theta$ represents the space interval between the lines of sub-scanning. When $\theta=0$, i.e., when the laser exposure system 3 is so disposed as to permit the scanning line OS1 to coincide with the line (X1—X1), since the photosensitive body is moved by a distance $\delta$ during a period of time, in which the same is irradiated over the length of $l_1$ by the laser, the printing lines do not become parallel as at lines (B1 - C) or lines (B2 - C) in FIG. 7A when a succeeding one thereof is printed per dot with a different color. On the other hand, if the laser 3 and the LED array 6 are disposed so as to permit the scanning line OS1 and the reference line (X1—X1) to have a relation of $\theta = \tan^{-1} \simeq /l_1$, it would advantageously be possible to effect printing of two parallel lines of different colors, as shown in FIG. 7B.

Figure 8:
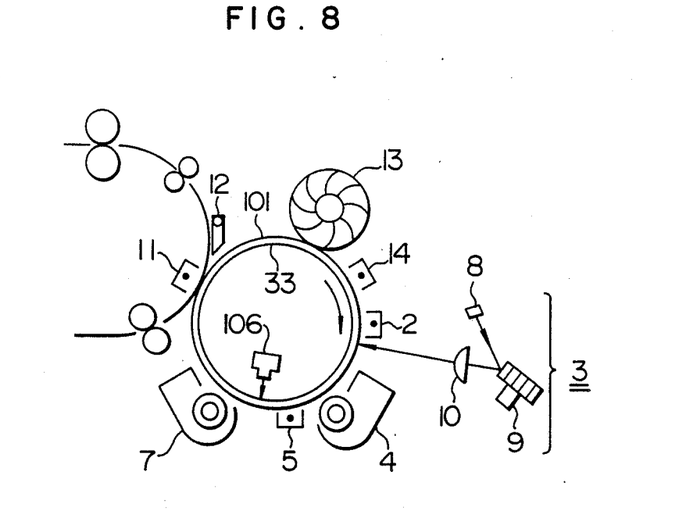
FIG. 8 is a longitudinal sectional view of an electrophotographic recording apparatus in accordance with a further embodiment of the invention.

FIG. 8 shows an arrangement in which the base material of the photosensitive body 1 is constituted by a transparent conductive member 33 and in which an LED array 106 is disposed inside the photosensitive body 101. This embodiment brings about an advantage of enabling miniaturization of the electrophotographic recording apparatus as compared with the embodiment shown in FIG. 1.

Figure 9:
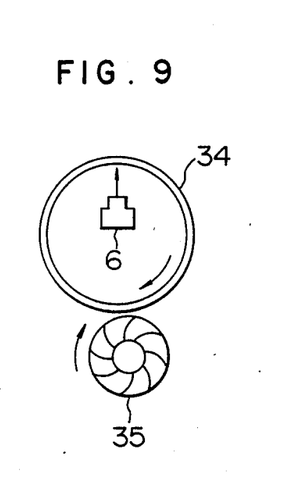
FIGS. 9 to 14 are longitudinal sectional views of portions of electrophotographic recording apparatuses in accordance with yet further embodiments of the invention, respectively.

FIGS. 9 to 12 are illustrations which are intended to take measures against the contamination of a front surface of the LED array due to attachment of toner onto the same. In FIG. 9, the LED array 106 is disposed inside a transparent rotating body 34 so as to prevent any toner from attaching onto the front surface of the LED array 106. At the same time, the transparent rotating body 34 is so arranged as to be cleaned by a cleaning means 35 such as fur brush.

Figure 10:
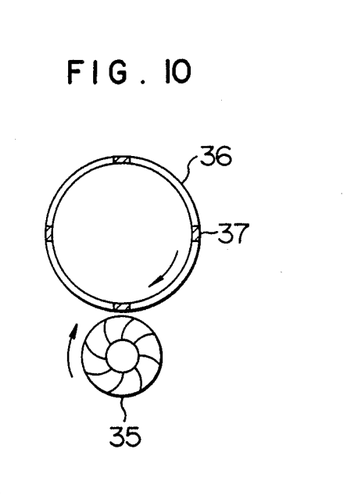

In FIG. 10, thin-film like LEDs 37 are provided on a hollow rotating cylinder 36 in such a manner that they are connected to each other. At the same time, the LEDs 37 are so arranged as to be cleaned by the cleaning means 35. This embodiment has the following merits. The number of the parts is reduced and the apparatus can be made small in size and weight as compared with the embodiment of FIG. 9. In addition, since the LED array can be increased in number if the diameters of the rotating cylinder are the same, it is possible to prolong the service life of the LED array 37. In addition, since the thin-film like LED array 37 is mounted on the rotating cylinder 36 per se, a further merit is brought about in that it becomes easy to cool the LED array from outside.

Figure 11:
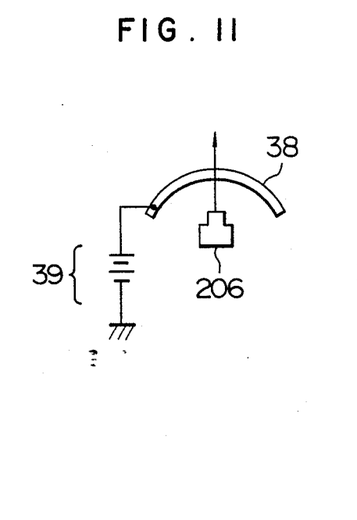
Figure 12:
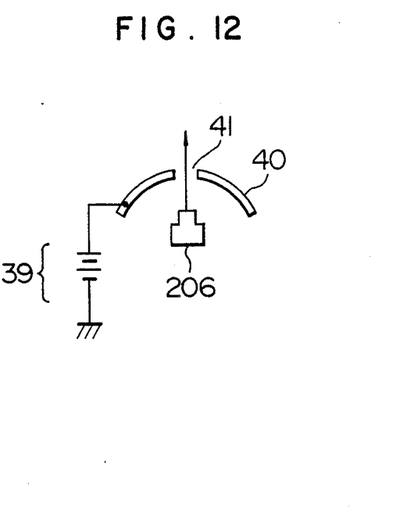

FIGS. 11 and 12 respectively illustrate arrangements wherein cover electrodes 38, 40 are provided in front of LED arrays and are so arranged as to permit voltages having the same polarity as that of toner to be applied thereto. In FIG. 11, a transparent conductive member 38 is used as the cover electrode 38 but, in FIG. 12, an opening 41 is provided in the cover electrode 40. That is, with the arrangement of FIG. 12, it is not always necessary to employ a transparent conductive member as the cover electrode 40. In these arrangements, a voltage source for exclusive use may be employed as a voltage source 39 for application of said voltage. However, a bias voltage source 52 for the second developing device (see FIG. 3) had better be concurrently employed as such voltage source 39. This is because there is obtained a merit that the apparatus becomes smaller in size and lower in cost by that extent.

Figure 13:
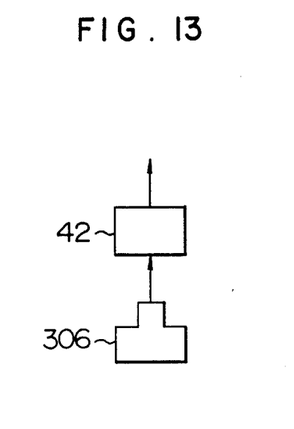

FIG. 13 illustrates an arrangement in which a wavelength converting means 42 is provided in front of an LED array 306. This embodiment provides an advantage that the wavelength of the LED array 306 can be made to coincide with that of the laser 8, or that the wavelength of the LED array 306 can be moved to a wavelength zone of the photosensitive body 1 where the sensitivity thereof is high.

Figure 14:
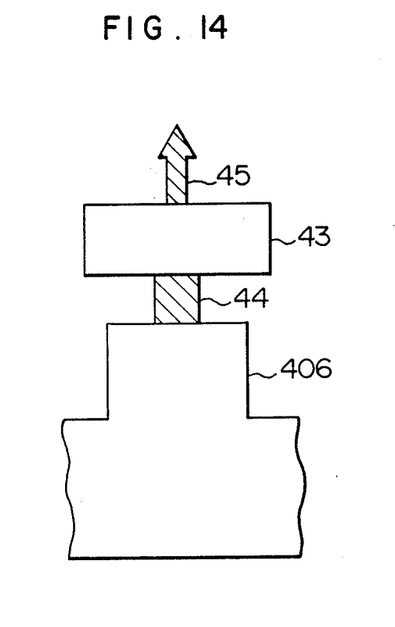

FIG. 14 illustrates an arrangement in which a beam conversion means 43 is provided in front of an LED array 406. A liquid crystal shutter or the like can be employed as the beam conversion means 43. This embodiment brings about a merit that clearness of a print image can be increased by conversion of a beam 45 into a circular, square, or rectangular shape in cross section. When the sectional dimension of a beam becomes small, spaces are created between the beams. To eliminate this drawback, it suffices to dispose the LED array 406 by offsetting the same by a plurality of rows.

Figure 15:
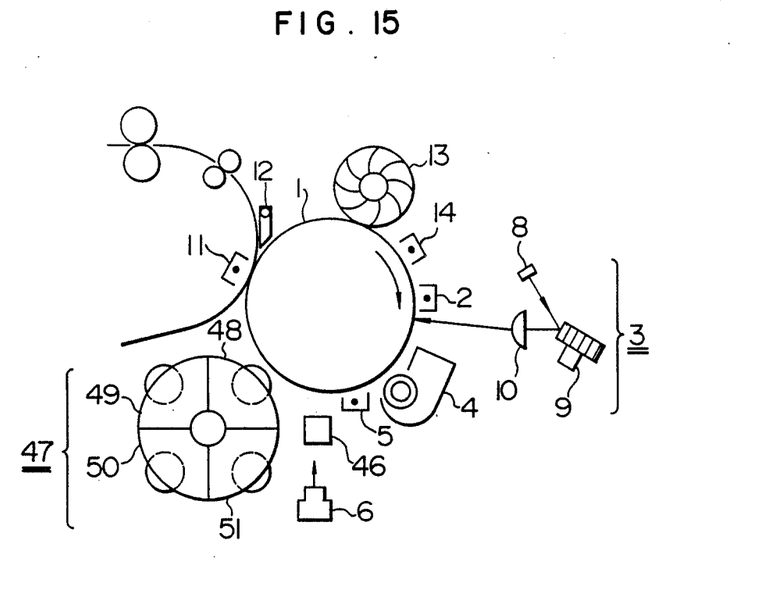
FIG. 15 is a longitudinal sectional view of an electrophotographic recording apparatus in accordance with a yet further embodiment of the invention.

FIG. 15 illustrates an arrangement in which an optical system 46 adapted to form an optical image reduced or magnified in size is disposed in front of the LED array 6. In addition, in this embodiment, a rotary developing machine 47 equipped with a black toner and three-color toners is disposed as the second developing device. This embodiment differs from the embodiment of FIG. 1 in that (1) each of a black image and a color image can be reduced or increased in size and (2) change in color during the bicolor printing operation is easy. Although, in this embodiment, the rotary developing machine 47 has been employed solely for the second developing device, it is also possible to dispose a rotary developing machine of about four colors for the first developing device as well. In this case, it is possible to judge and determine the resolution of a print image simply by using a reference, irrespective of the color thereof, i.e., irrespective of whether the image is a black image or a color image. And it is advantageously possible to effect developing of a print image of high fineness by using the first developing machine and, developing of a print image of low fineness by using the second developing machine.

Figure 16:
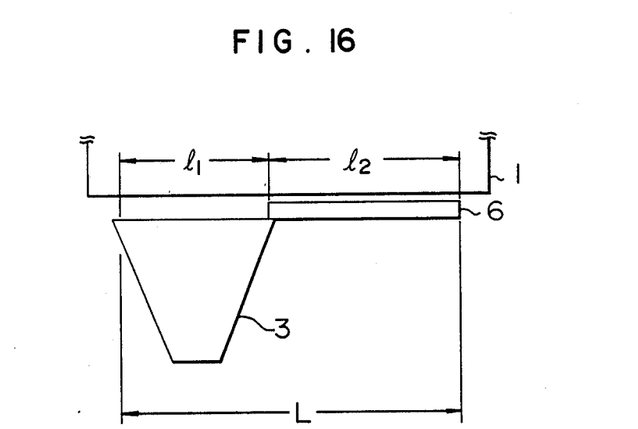
FIG. 16 is a cross sectional view of an electrophotographic recording apparatus in accordance with a yet further embodiment of the invention.

FIG. 16 illustrates an arrangement in which exposure of a paper sheet portion having a specified width $l_1$ of a width L is effected by the laser 3 and exposure of another paper sheet portion having the remaining width $l_2$ is effected by the LED array 6. This embodiment provides the following merits. (1) Limitation in size of a paper sheet used can be moderated. (2) In addition, printing over a specified paper-sheet width can be effected with high resolution. And (3) it is possible to greatly reduce the space occupied by the whole optical system as compared with the case where exposure of the paper sheet portion having the width L is effected by the laser 3 alone.

Incidentally, the electrophotographic recording apparatus according to the present invention can not only be used as a terminal equipment for a computer but also be used as (1) an electrophotographic recording apparatus for an intelligent copier capable of reduction and magnification in size, change-over of resolution, and color printing, and as (2) a printer for a word-processor, personal computer, facsimile and workstation.

Each of the above-described embodiments of the present invention has referred to the case where the laser exposure section is constituted by the first exposure means and the LED exposure section by the second exposure means. Conversely, however, the LED exposure section may be constituted by the first exposure means and the laser exposure section by the second exposure means, though not shown. In this case, contact developing section and non-contact developing section may also be reversed from each other.

Furthermore, a third exposure means such as a laser, LED, etc. and a third developing means may be provided so as to provide a more multicolor and multifunctional apparatus.

As has been described above, according to the present invention, a print image of high fineness or high resolution can be formed through exposure effected by a laser and a print image permitted to have even a low fineness or even a low resolution can be formed through exposure effected by an LED array. For this reason, it is possible to prevent the apparatus from increasing in size due to the use of a plurality of lasers and it is possible to moderate the limitation imposed upon the resolution in the case where the LED array alone are employed two or more in number. In addition, it is possible to make the apparatus small in size, to effect a highly fine color printing, and to effect reduction and magnification printing.

What is claimed is

1. An electrophotographic recording apparatus comprising:
   an electrostatic charging means for electrostatically charging a surface of a photosensitive body on a substantially uniform basis;
   an exposure means including a laser exposure section for exposing said surface of said photosensitive body to an optical image having a high resolution, and a light emitting diode array exposure section for exposing said surface of said photosensitive body to an optical image having a low resolution, said exposure means being adapted to form an electric charge latent image on said surface of said photosensitive body by said laser exposure section and said light emitting diode array exposure section;
   a developing means for effecting developing of said electric charge latent image by using a developer containing at least a toner to thereby form a toner image;
   a transferring/fixing means for transferring and fixing onto a recording sheet of paper the toner image formed on said surface of said photosensitive body.

2. An electrophotographic recording apparatus comprising:
   an electrostatic charging means for electrostatically charging a surface of a photosensitive body on a substantially uniform basis;
   a first exposure means including a laser exposure section for exposing said surface of said photosensitive body to an optical image having a high resolution, said first exposure means being adapted to form a first electric charge latent image by said laser exposure section;
   a first developing means for effecting developing of said first electric charge latent image by using a developer containing at least a toner to thereby form a first toner image;
   a second exposure means including a light emitting diode array exposure section for exposing a portion of said surface of said photosensitive body at least different from the portion thereof where said first toner image has been formed, to an optical image having a low resolution, said second exposure means being adapted to form a second electric charge latent image by said light emitting diode array exposure section;
   a second developing means for effecting developing of said second electric charge latent image by using a developer containing at least a toner to thereby form a second toner image; and
   a transferring/fixing means for simultaneously transferring and fixing onto a recording sheet of paper said first and second toner images formed on said surface of said photosensitive body.

3. An electrophotographic recording apparatus comprising:
   an electrostatic charging means for electrostatically charging a surface of a photosensitive body on a substantially uniform basis;
   a first exposure means including a light emitting diode array exposure section for exposing said surface of said photosensitive body to an optical image having a low resolution, said first exposure means being adapted to form a first electric charge latent image by said light emitting diode array exposure section;
   a first developing means for effecting developing of said first electric charge latent image by using a developer containing at least a toner to thereby form a first toner image;
   a second exposure means including a laser exposure section for exposing a portion of said surface of said photosensitive body at least different from the portion thereof where said first toner image has been formed, to an optical image having a high resolution, said second exposure means being adapted to form a second electric charge latent image by said laser exposure section;
   a second developing means for effecting developing of said second electric charge latent image by using a developer containing at least a toner to thereby form a second toner image; and
   a transferring/fixing means for simultaneously transferring and fixing onto a recording sheet of paper said first and second toner images formed on said surface of said photosensitive body.

4. An electrophotographic recording apparatus comprising:
   an electrostatic charging means for electrostatically charging a surface of a photosensitive body on a substantially uniform basis;
   an exposure means including a laser exposure section and a light emitting diode array exposure section, said laser exposure section being intended for exposing said surface of said photosensitive body to an optical image, said light emitting diode array exposure section being intended for exposing said surface of said photosensitive body to an optical image, said exposure means being adapted to form a first electric charge latent image by said laser exposure section and to form a second electric charge latent image by said light emitting diode array exposure section;
   a developing means for effecting developing of said first electric charge latent image by using a developer containing at least a first toner to thereby form a first toner image and for effecting developing of said second electric charge latent image by using a developer containing at least a second toner higher in lightness than said first toner, to thereby form a second tone image; and
   a transferring/fixing means for transferring and fixing onto a recording sheet of paper said first and second toner images formed on said surface of said photosensitive body.

5. An electrophotographic recording apparatus comprising:
   an electrostatic charging means for electrostatically charging a surface of a photosensitive body on a substantially uniform basis;
   a first exposure means including a laser exposure section for exposing said surface of said photosensitive body to an optical image, said first exposure means being adapted to form a first electric charge latent image by said laser exposure section;

a first developing means for effecting developing of said first electric charge latent image by using a developer containing at least a toner to thereby form a first toner image;

a second exposure means including a light emitting diode array exposure section for exposing a portion of said surface of said photosensitive body at least different from the portion thereof where said first toner image has been formed, to an optical image, said second exposure means being adapted to form a second electric charge latent image by said light emitting diode array exposure section;

a second developing means for effecting developing of said second electric charge latent image by using a developer containing at least a second toner higher in lightness than said first toner, to thereby form a second toner image; and transferring/fixing means for simultaneously transferring and fixing onto a recording sheet of paper said first and second toner images formed on said surface of said photosensitive body.

6. An electrophotographic recording apparatus comprising:

an electrostatic charging means for electrostatically charging a surface of a photosensitive body;

a first exposure means including a light emitting diode array exposure section for exposing said surface of said photosensitive body to an optical image, said first exposure means being adapted to form a first electric charge latent image by said light emitting diode exposure section;

a first developing means for effecting developing of said first electric charge latent image by using a developer containing at least a toner to thereby form a first toner image;

a second exposure means including a laser exposure section for exposing to an optical image a portion of said surface of said photosensitive body at least different from the portion thereof where said first toner image has been formed, said second exposure means being adapted to form a second electric charge latent image by said laser exposure section;

a second developing means for effecting developing of said second electric charge latent image by using a developer containing at least a second toner lower in lightness than said first toner to thereby form a second toner image; and a transferring/fixing means for simultaneously transferring and fixing onto a recording sheet of paper said first and second toner images formed on said surface of said photosensitive body.

7. An electrophotographic recording apparatus comprising:

an electrostatic charging means for electrostatically charging a surface of a -photosensitive body on a substantially uniform basis;

an exposure means including a first exposure section for exposing said surface of said photosensitive body to an optical image of high resolution by scanning in the order of dot sequence, and a second exposure section for exposing said surface of said photosensitive body to an optical image of low resolution by scanning in the order of line sequence, said exposure means being adapted to form electric charge latent images by said first and second exposure sections;

a developing means for effecting developing of said electric charge latent images by using a developer containing at least a toner to thereby form toner images; and a transferring/fixing means for transferring and fixing onto a recording sheet of paper said toner images formed on said surface of said photosensitive body.

8. An electrophotographic recording apparatus comprising:

an electrostatic charging means for electrostatically charging a surface of a photosensitive body on a substantially uniform basis;

a first exposure means for exposing said surface of said photosensitive body to an optical image of high resolution through scanning in the order of dot sequence to thereby form a first electric charge latent image;

a first developing means for effecting developing of said first electric charge latent image by using a developer containing at least a toner to thereby form a first toner image;

a second exposure means for exposing a port of said surface of said photosensitive body at least different from the portion thereof where said first toner image has been formed, to an optical image of low resolution through scanning in the order of line sequence, to thereby form a second electric charge latent image;

a second developing means for effecting developing of said second electric charge latent image by using a developer containing at least a toner to thereby form a second toner image; and a transferring/fixing means for simultaneously transferring and fixing onto a recording sheet of paper said first and second toner images formed on said surface of said photosensitive body.

9. An electrophotographic recording apparatus comprising:

an electrostatic charging means for electrostatically charging a surface of a photosensitive body on a substantially uniform basis;

a first exposure means for exposing said surface of said photosensitive body to an optical image of low resolution through scanning in the order of line sequence to thereby form a first electric charge latent image;

a first developing means for effecting developing of said first electric charge latent image by using a developer containing at least a toner to thereby form a first toner image;

a second exposure means for exposing a portion of said surface of said photosensitive body at least different from the portion thereof where said first toner image has been formed to an optical image of high resolution through scanning in the order of dot sequence, to thereby form a second electric charge latent image;

a second developing means for effecting developing of said second electric charge latent image by using a developer containing at least a toner to thereby form a second toner image; and a transferring/fixing means for simultaneously transferring and fixing onto a recording sheet of paper said first and second toner images formed on said surface of said photosensitive body.

10. An electrophotographic recording apparatus comprising:

an electrostatic charging means for electrostatically charging a surface of a photosensitive body on a substantially uniform basis;

an exposure means for exposing said surface of said photosensitive body to an optical image through scanning in the order of dot sequence to thereby form a first electric charge latent image and for exposing said surface of said photosensitive body to an optical image through scanning in the order of line sequence to thereby form a second electric charge latent image;

a developing means for effecting developing of said first electric charge latent image by using a developer containing at least a first toner to thereby form a first toner image and for effecting developing of said second electric charge latent image by using a developer containing at least a second toner higher in lightness than said first toner, to thereby form a second toner image; and a transferring/fixing means for transferring and fixing onto a recording sheet of paper said first and second toner images formed on said surface of said photosensitive body.

11. An electrophotographic recording apparatus comprising:

an electrostatic charging means for electrostatically charging a surface of a photosensitive body on a substantially uniform basis;

a first exposure means for exposing said surface of said photosensitive body to an optical image through scanning in the order of dot sequence to thereby form a first electric charge latent image;

a first developing means for effecting developing of said first electric charge latent image by using a developer containing a toner to thereby form a first toner image;

a second exposure means for exposing a portion of said surface of said photosensitive body at least different from the portion thereof where said first toner image has been formed, to an optical image through scanning in the order of line sequence, to thereby form a second electric charge latent image;

a second developing means for effecting developing of said second electric charge latent image by using a developer containing at least a second toner higher in lightness than said first toner, to thereby form a second toner image; and a transferring/fixing means for simultaneously transferring and fixing onto a recording sheet of paper said first and second toner images formed on said surface of said photosensitive body.

12. An electrophotographic recording apparatus comprising:

an electrostatic charging means for electrostatically charging a surface of a photosensitive body on a substantially uniform basis;

a first exposure means for exposing said surface of said photosensitive body to an optical image through scanning in the order of line sequence to thereby form a first electric charge latent image;

a first developing means for effecting developing of said first electric charge latent image by using a developer containing at least a toner to thereby form a first toner image;

a second exposure means for exposing a portion of said surface of said photosensitive body at least different from the portion thereof where said first toner image has been formed, to an optical image through scanning in the order of dot sequence, to thereby form a second electric charge latent image;

a second developing means for effecting developing of said second electric charge latent image by using a developer containing at least a second toner lower in lightness than said first toner to thereby form a second toner image; and a transferring/fixing means for simultaneously transferring and fixing onto a recording sheet of paper said first and second toner images formed on said surface of said photosensitive body.

13. An electrophotographic recording apparatus according to claim 2, 5, 8 or 11, wherein the developing in said first developing means is effected by contact developing and the developing in the second developing means is effected by non-contact developing.

14. An electrophotographic recording apparatus according to claim 3, 6, 9 or 12, wherein the developing in said first developing means is effected by non-contact developing and the developing in said second developing means is effected by contact developing.

15. An electrophotographic recording apparatus according to any one of the preceding claims 1 to 6, wherein a photosensitive body having spectral sensitivity with respect to the emission wavelength of a laser and the emission wavelength of a light emitting diode array is employed as said photosensitive body.

16. An electrophotographic recording apparatus according to any one of the preceding claims 1 to 6, wherein the emission wavelength of a light emitting diode array is made substantially equal to that of a laser.

17. An electrophotographic recording apparatus according to any one of the preceding claims 1 to 6, wherein a thin-film emitting diode array is used to constitute said light emitting diode array exposure section.

18. An electrophotographic recording apparatus according to any one of the preceding claims 1 to 6, wherein said light emitting diode array exposure section is disposed inside said photosensitive body.

19. An electrophotographic recording apparatus comprising:

an electrostatic charging means for electrostatically charging a surface of a photosensitive body on a substantially uniform basis;

an exposure section including a laser exposure section for exposing said surface of said photosensitive body to an optical image of specified magnification, and a light emitting diode array exposure section for exposing said surface of said photosensitive body to an optical image magnified or reduced in size, said exposure means being adapted to form an electric charge latent image by said laser exposure section and said light emitting diode array exposure section;

a developing means for effecting developing of said electric charge latent image by using a developer containing at least a tone to thereby form a toner image; and a transferring/fixing means for transferring and fixing onto a recording sheet of paper said toner image formed on said surface of said photosensitive body.

20. An electrophotographic recording apparatus comprising:

an electrostatic charging means for electrostatically charging a surface of a photosensitive body on a substantially uniform basis;

an exposure means including a first exposure section for exposing a predetermined width of surface of said photosensitive body to an optical image through scanning in the order of dot sequence, and a second exposure section for exposing a portion of said surface of said photosensitive body having a width exceeding said predetermined width and excluding the same, to an optical image through scanning in the order of line sequence, said exposure means being adapted to form an electric charge latent image by said first exposure section and said second exposure section;

a developing means for effecting developing of said electric charge latent image by using a developer containing at least a toner to thereby form a toner image; and a transferring/fixing means for transferring and fixing onto a recording sheet of paper said toner image formed on said surface of said photosensitive body.

21. An electrophotographic recording apparatus according to any one of the preceding claims 1 to 6, wherein the direction of scanning by the laser light and the direction of disposition of the light emitting diode array define a specified angle.

22. An electrophotographic recording apparatus comprising a photosensitive body, a solid light emitting element array, and a developing device, whereby after said photosensitive body is charged, said photosensitive body is exposed to an optical image to thereby form an electric charge latent image on said photosensitive body, said electric charge latent image being developed by said developing device to thereby form a visible image composed of fine particles, said apparatus further comprising an electrode which centers said solid light emitting element array and to which is applied a voltage of the same polarity as that of said developing fine particles.

23. An electrophotographic recording apparatus according to claim 22, wherein said electrode is constituted by a transparent conductive member.

24. An electrophotographic recording apparatus comprising a photosensitive body, a light emitting diode array and a developing deice, whereby after said photosensitive body has been charged, said photosensitive body is exposed by said light emitting diode to thereby form an electric charge latent image on said photosensitive body, said electric charge latent image being developed by said developing device to thereby form a visible image composed of fine particles, said apparatus further comprising a wavelength converting means which is disposed in front of said light emitting diode array.

25. An electrophotographic recording apparatus comprising a photosensitive body, a light emitting diode array and a developing device, whereby after said photosensitive body has been electrostatically charged, said photosensitive body is exposed to an optical image by said light emitting diode array to thereby form an electric charge latent image on said photosensitive body, said electric charge latent image being developed by said developing device to thereby form a visible image composed of fine particles, said apparatus further comprising a beam converting means which is disposed in front of said light emitting diode array for controlling at least one of a wavelength and a cross-sectional shape of a beam emitted from said light emitting diode array.

26. A data processing apparatus comprising an electrophotographic recording apparatus in accordance with any one of the preceding claims 1 to 12, 19, 20 and 22 to 25, and a computer.

27. A processing apparatus comprising an electrophotographic recording apparatus in accordance with claim 13, and a computer.

28. A processing apparatus comprising an electrophotographic recording apparatus in accordance with claim 14, and a computer.

29. A processing apparatus comprising an electrophotographic recording apparatus in accordance with claim 15, and a computer.

30. A processing apparatus comprising an electrophotographic recording apparatus in accordance with claim 16, and a computer.

31. A processing apparatus comprising an electrophotographic recording apparatus in accordance with claim 17, and a computer.

32. A processing apparatus comprising an electrophotographic recording apparatus in accordance with claim 18, and a computer.

33. A processing apparatus comprising an electrophotographic recording apparatus in accordance with claim 21, and a computer.

* * * * *